Sept. 12, 1939.  A. H. PEYCKE ET AL  2,172,567
WIND BRAKE
Filed Dec. 29, 1934  2 Sheets-Sheet 1
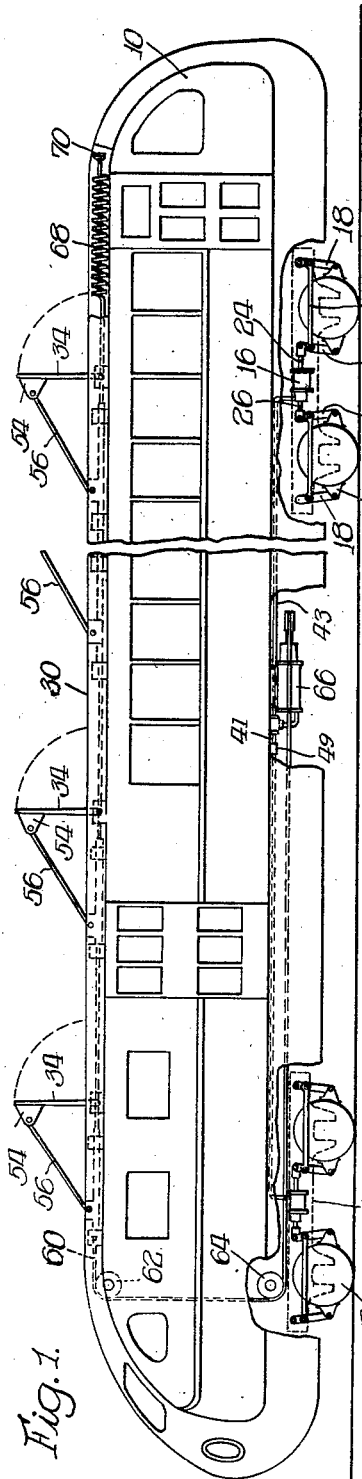
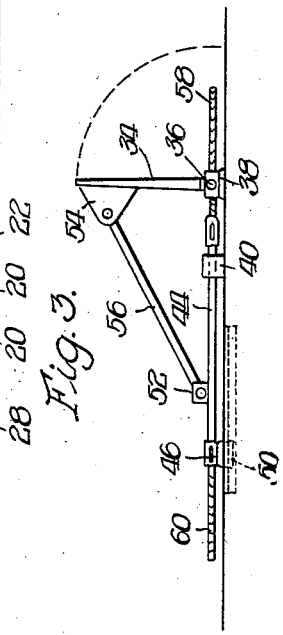
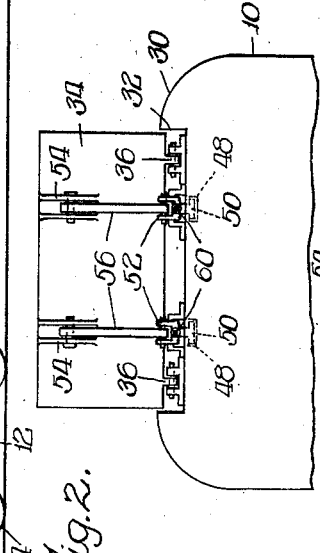
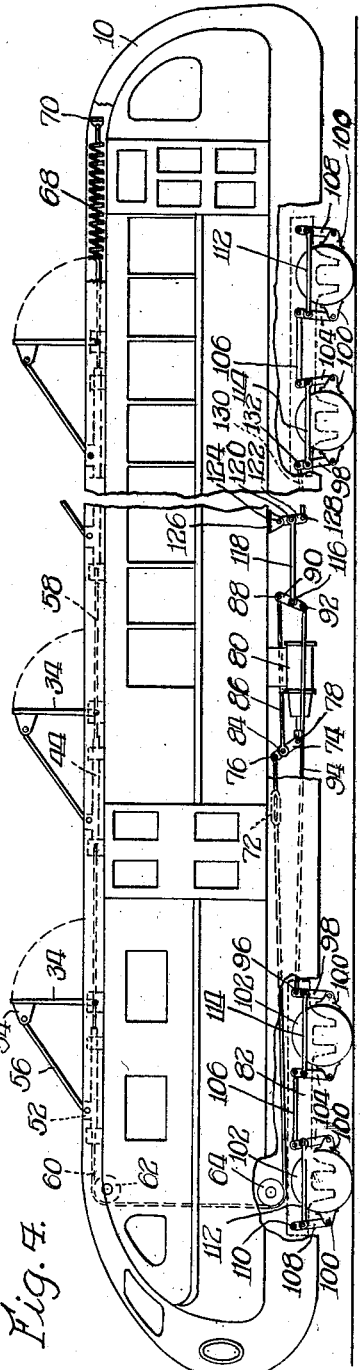
Inventors:
Armand H. Peycke,
Robert W. Clyne,
Walter H. Baselt,

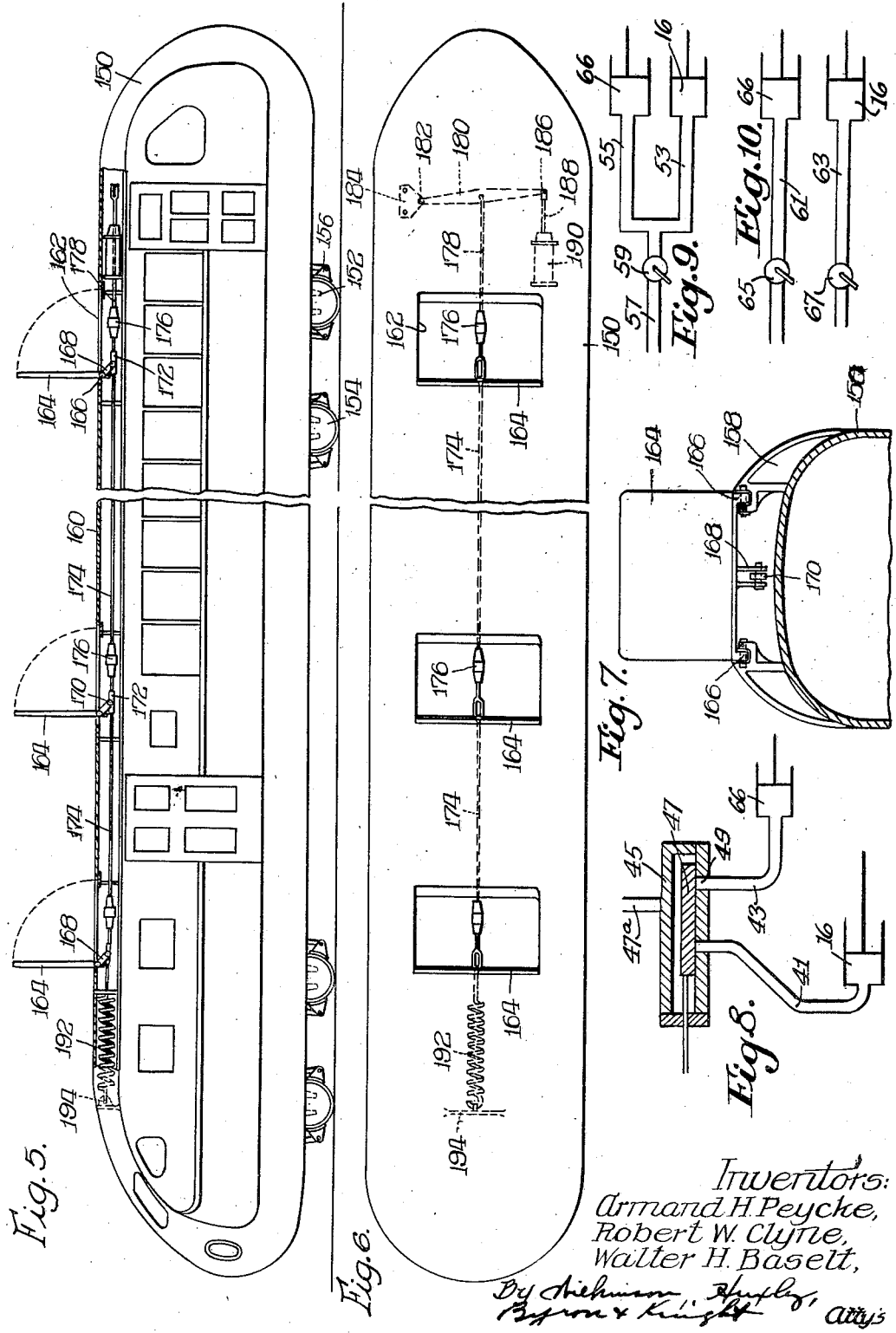

Patented Sept. 12, 1939

2,172,567

UNITED STATES PATENT OFFICE 2,172,567

WIND BRAKE

Armand H. Peycke, Kenilworth, and Robert W. Clyne and Walter H. Baselt, Chicago, Ill., assignors to American Steel Foundries, Chicago, Ill., a corporation of New Jersey Application December 29, 1934, Serial No. 759,626

34 Claims. (Cl. 188—33)

This invention pertains to brakes.

With the development of the present high speed trains, where streamlining is resorted to in an effort to decrease the wind resistance, it is of course of primary importance that the trains should be capable of a high rate of deceleration from any attained velocity. A number of other factors must be considered in the provision of brakes for the high speed trains. Namely, if the ordinary wheel brakes are used for quick braking, there is danger of derailing or of slid wheels. The present high speed trains being of light construction, it is further desirable that increased brake shoe pressures be attainable without undesirable wear or destruction of the parts of the braking system or of the wheels.

It is therefore an object of this invention to provide a streamlined car having aerodynamic brakes.

Another object is to provide a braking system for railway rolling stock wherein aerodynamic brakes are associated with truck brakes and adapted to be operated either in a predetermined sequence with the truck brakes, or simultaneously therewith, or independently thereof.

A further object is to provide aerodynamic brakes which are so disposed that they will not only exert a plain decelerating force by increasing the air resistance of the vehicle as a whole, but will also cause a downward component of force to be exerted on operation of the aerodynamic brakes to braking position.

A yet further object is to provide aerodynamic brakes, the operation of which will result in increased vehicle wind resistance and parasitic drag or eddying to reduce the kinetic energy of the vehicle and result in vehicle deceleration.

A still further object is to provide aerodynamic brakes adapted to be operated to exert a partially decelerating effect upon the vehicle, the effective angle of the brakes being controlled by the operator.

A different object is to provide a power operated aerodynamic brake for railway rolling stock or other high speed vehicles.

A still different object is to provide aerodynamic brakes which will result in effective and positive vehicle deceleration, and an effective reduction of the stopping distance and time necessary for decelerating a vehicle, and in a material reduction of brake shoe wear on the shoes of the associated truck brakes.

Another different object is to provide aerodynamic brakes so formed and disposed that they will increase in effectiveness with the increased vehicle velocity, and with decreased vehicle wind resistance.

Yet another object is to provide aerodynamic and associated wheel brakes which fulfill all requirements of manufacture and service, and are inexpensive to make and maintain.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation of a streamlined car with parts broken away and showing a brake system embodying the invention applied thereto;

Figure 2 is an enlarged transverse sectional elevation taken through the upper part of the car body and showing the aerodynamic or wind brakes in operative position;

Figure 3 is a side elevation of the wind brake shown in Figure 2;

Figure 4 is a side elevation of a streamlined car with parts broken away showing a modified form of brake system applied thereto;

Figure 5 is a side elevation of a streamlined car with parts broken away showing still another modified form of brake system applied thereto;

Figure 6 is a top plan view of the car illustrated in Figure 5;

Figure 7 is a transverse sectional elevation through a portion of the car illustrated in Figure 5, and showing the wind brake in operative position;

Figure 8 is a diagrammatic view of the control mechanism for the brake system of the present invention;

Figure 9 is a diagrammatic view of a modified form of control mechanism for the brake system of the present invention; and Figure 10 is a diagrammatic view of still another modified form of control mechanism for the brake system of the present invention.

Referring first of all more particularly to the construction illustrated in Figures 1 to 3 inclusive, the streamlined car 10 is provided with the spaced trucks 12 supported on the wheel and axle assemblies 14, the trucks illustrated being four wheel trucks. The brake system applied to this form of car truck is in general that shown in application Serial No. 602,705, filed April 2, 1932, by Walter H. Baselt, wherein the operating cylinder 16 is applied to each side of the side frame of each of the car trucks intermediate the two wheel and axle assemblies 14. Each brake cylinder 16 is adapted to operate the truck levers on its respective side of each truck. As illustrated, these truck levers comprise the end dead truck levers 18, the intermediate live truck levers 20, pairs of end and intermediate levers being connected by means of the pull rods 22 disposed above the axle level. Suitable connections illustrated generally at 24 connect the intermediate levers 20, and are connected to the piston rod 26 of the operating cylinder 16.

In the operation of this form of brake controlled from the operating compartment at the forward end of the car, operation of the cylinder causes outward movement of the piston rod 26 to apply the brake shoe and head assembly 28 to each side of the wheels, said head and shoe assemblies being provided on each of the truck levers. In order to supplement the action of the mechanical brakes, wind brakes are provided as shown applied to the roof of the car, though of course it is to be understood that the wind brakes may be located on the sides or elsewhere as desired. They may be at the front or at the rear of the vehicle, or at several locations.

Inasmuch as the wind brakes are intended for application to streamlined cars, it is important that they offer little or no resistance to air when in inoperative position. To this end, in the illustration shown, the car roof 30 is recessed as at 32 and provided with the air foils or vanes 34. These vanes, when in inoperative position form a substantially unbroken component part of the car roof, and at the same time are so shaped either in any curve or plane surface that they will adversely affect the slip stream of the vehicle when in operative position. The vanes may be either flat or corrugated, suitably reenforced, or they may be of airplane construction. The wings are pivoted as at 36 to the brackets 38 provided in the recess 32, and adjacent each of the brackets there is provided a bearing 40 for the pull rod 44, the pull rod being further provided adjacent its forward end with the bearing 46 slidably mounted in the recess 48 provided in the car roof, the lower end of the bearing being interlocked as at 50 therewith to prevent misalignment of the pull rod 44.

The pull rod 44 is provided with the upwardly extending bracket 52 connected to the bracket 54 provided on the wings 34 by means of the strut 56 pivotally connected to said brackets. Adjacent pull rods 44 are connected to each other by means of the flexible cables 58, and the forward pull rod is provided with the cable 60 engaging and being guided by the pivotally mounted sheaves or rollers 62 and 64 and extending rearwardly below the car body and being operatively connected as by a crosshead to the operating cylinder 66 mounted below the car body. The cables connected to the wing located at the after end of the car are connected to the contractile springs 68 fastened to the car body as at 70 and normally urging the wings to inoperative position.

The cylinders 16 and 66 may be so associated that the cylinder 66 is operated prior to the operation of the cylinder 16. As an illustration, the cylinders 16 and cylinder 66 may be connected respectively by conduits 41 and 43, as shown in Figure 8, with a fluid cylinder 45 connected with a source 47ª of fluid under pressure. Disposed within the cylinder 45 is a movable valve 47 adapted to open the port 49 to conduit 43 to operate cylinder 66 during which time port 51 to conduit 41 is closed. Further movement of valve 47 allows the fluid in cylinder 45 to operate cylinders 16.

When it is desired to operate cylinders 16 and cylinder 66 simultaneously, an arrangement such as shown in Figure 9 can be used, wherein cylinders 16 and cylinder 66 are connected by conduits 53 and 55 to a common conduit 57 leading to a source of fluid under pressure and in which is disposed valve 59. As clearly understood, when valve 59 is operated cylinders 16 and cylinder 66 are operated simultaneously.

Further, the cylinders 16 and cylinder 66 can be selectively operated by the arrangement as shown in Fig. 10 wherein said cylinders are, respectively, connected to sources of fluid under pressure through conduits 61 and 63 in which are disposed valves 65 and 67. By operating valves 65 and 67, any desired sequence of operation of cylinders 16 and cylinder 66 can be effected. Assuming the vanes to be in inoperative position, operation of the cylinder 66 by the engineer will cause rearward movement of the piston of said cylinder whereby forward movement of the pull rods 44 is effected by means of the cable 60. Forward movement of said pull rods will cause the vanes to revolve about their pivots 36 to cause them to assume substantially a vertical position where they will cause rapid deceleration of the vehicle.

As an associated operation, the cylinder 16 will be operated to apply the brake shoes to the wheels, causing the usual braking at the trucks. Release of the operating medium will cause the contractile spring 68 to lower the vanes into inoperative position where they are streamlined into the car body, and release of the brake shoes 28 is also effective to permit operation of the car.

In the construction illustrated in Figure 4, the vanes 34 are likewise streamlined into the top of the car, and adjacent pull rods 44 are connected by means of the cables 58, the pull rods at the after end of the car being secured as before to the contractile springs 68 secured to the car body as at 70. The forward pull rod is connected to the cable 60 which extends over the sheaves 62 and 64 and is connected through the turnbuckle 72 to one end of the floating lever 74 as at 76. The other end of the lever is connected as at 78 to the piston rod of the operating cylinder 80 mounted on the car body intermediate the spaced trucks 82. The floating lever 74 is pivotally connected intermediate the ends thereof as at 84 to the pull rod 86, the pull rod being pivotally connected as at 88 to one end of the floating lever 90, the lower end of said lever being pivotally connected as at 92 to the pull rod 94. While levers 74 and 90 are shown as vertical for convenience of illustration, they of course may be horizontally disposed.

The other end of the pull rod 94 is pivotally connected as at 96 to the upper end of the live truck lever 98. The live truck lever 98 is provided at its lower end with the brake head and shoe assembly 100 adapted to have braking cooperation with the after wheel and axle assembly 102, the spaced wheel and axle assemblies 102 serving to support the truck 82. The inner live truck levers 104 are likewise provided with the brake head and shoe assemblies 100, said intermediate live truck levers being connected adjacent the upper ends thereof by means of the pull rod 106.

At the forward end of the truck 82 the dead truck lever 108 is provided pivoted to the truck 82 as at 110 and being provided with the brake shoe and head arrangement 100. The dead truck lever 108 is connected to its associated intermediate live truck lever by means of the pull rod 112 and the other intermediate live truck lever 104 is connected through a similar pull rod 114 to the end truck lever 98. The floating lever 90 is pivotally connected as at 116 to the pull rod 118, said pull rod being pivotally connected as at 120 to the dead body lever 122 which is pivotally connected as at 124 to the bracket 126 provided on the car body. The other end of the dead body lever 122 is pivotally connected as at 128 to the pull rod 130, the pull rod 130 being pivotally connected as at 132 to the end live truck lever 98 provided on the rear truck. The brake system on the rear truck is similar to the brake system on the forward truck. The similar parts are similarly numbered, each truck lever being provided with the brake head and shoe arrangements 100.

In the operation of the brakes in this modification, there is substantially a simultaneous operation of the wind and truck brakes, the operator merely causing operation of the cylinder 80 whereupon outward movement of the piston rod causes movement of the live lever 74 in a clockwise direction about the fulcrum 84, whereupon movement of the cable 60 causes the vanes 34 to assume a vertical or a nearly vertical position against the action of the spring 68. Movement of the piston rod likewise causes the pull rod 86 to move the floating lever 90 in a counterclockwise direction around the fulcrum 116, whereupon the pull rod 94 causes application of the wheel brakes of the forward truck. At the same time, forward movement of the floating lever 90 causes rotation of the dead body lever 122 about the fulcrum 124, causing the pull rod 130 to apply the wheel brakes of the after truck. Release of the operating medium of the cylinder 80 will permit release of the wheel brakes, and will permit operation of the spring 68 to return the wind brakes to inoperative position.

In the construction illustrated in Figures 5 to 7 inclusive, there is shown an independent wind brake mounted in the car roof. The car body 150 is of streamline construction, being provided with the four wheel trucks 152 provided with the supporting wheel and axle assemblies 154 having associated therewith the clasp brakes 156 adapted to be operated in the usual manner. In this instane, the roof of the car may conveniently be provided with the air conditioning ducts 158 disposed in a streamline manner, the ducts being located at opposite sides of the car. An intermediate roof portion 160 is normally provided between the ducts, said intermediate portion being interrupted at desired places, as at 162, for the application to the roof of the vanes 164, which in inoperative position are streamlined into the intermediate roof portion to form an unbroken part thereof.

The vanes 164 are pivotally mounted as at 166 and are provided with integral cranks 168 pivotally connected as at 170 to the slide 172. Adjacent cranks are connected by means of the flexible cables or pull rods 174 which may be provided with the turnbuckles 176 for adjustment thereof. The end cable 178 is connected to the dead operating lever 180 pivotally connected as at 182 to the bracket 184, the other end of the lever being pivotally connected as at 186 to the piston rod 188 of the operating cylinder 190. The crank of the other end vane is connected to the contractile spring 192 located at the forward end of the car, the spring being connected thereto as at 194.

Operation of the cylinder 190, either simultaneously or in some preferred connection with the operation of the truck brakes, as by means of control mechanism as shown in Figures 8 and 9 for example, causes rotation of the crank 180 in a counter-clockwise direction, whereupon the cables or pull rods 178—174 cause rotation of the vanes 164 about their pivots 166 to substantially vertical operative position against the action of the spring 192. Release of the operating medium will permit the contractile spring 192 to return the vanes into their streamline position on the car roof. In this as in the other modifications the operating medium is preferably released slowly so as to eliminate undesirable noise as the vanes assume inoperative position.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. In a mounting for an aerodynamic brake, the combination of a bracket, a vane pivoted to said bracket, a bearing disposed adjacent said bracket, a pull rod movably mounted in said bearing, brackets on said pull rod and vane, and a strut pivotally connected to said last named brackets.

2. In a mounting for an aerodynamic brake, the combination of a bracket, a vane pivoted to said bracket, spaced bearings disposed adjacent said bracket, a pull rod having sliding cooperation with said bearings, brackets on said pull rod and vane, and a strut pivotally connected to said last named brackets, one of said last named brackets being disposed between said bearings.

3. In a brake arrangement, the combination of a car body, trucks supporting said car body, said trucks having spaced wheel and axle assemblies, aerodynamic brakes including vanes streamlined in inoperative position into the car roof and pivoted thereto and forming a substantially unbroken contour therewith, means for normally maintaining said vanes in inoperative position, an operating cylinder disposed beneath said car body and operatively connected to said vanes.

4. In a brake arrangement, the combination of a car body, trucks supporting said car body, said trucks having spaced wheel and axle assemblies, aerodynamic brakes including vanes streamlined in inoperative position into the car roof and pivoted thereto and forming a substantially unbroken contour therewith, means for normally maintaining said vanes in inoperative position, an operating cylinder disposed beneath said car body and operatively connected to said vanes through a flexible cable extending to said vanes and guided by means on said car body.

5. In a brake arrangement, the combination of a car body, aerodynamic brakes on the roof of said car body and pivotally mounted on and forming a substantially unbroken contour with the car roof, means for normally maintaining said aerodynamic brakes in inoperative position, and an operating cylinder disposed beneath said car body and operatively connected to said aerodynamic brakes.

6. In a brake arrangement, the combination of a car body, trucks supporting said car body, said trucks having spaced wheel and axle assemblies, brakes adapted to have braking cooperation with said wheel and axle assemblies, operating means for said wheel and axle assembly brakes, aerodynamic brakes on the roof of said car body and pivotally mounted on and forming a substantially unbroken contour with the car roof, means for normally maintaining said aerodynamic brakes in inoperative position, an operating cylinder disposed beneath said car body and operatively connected to said aerodynamic brakes, the operating means for the wheel and axle assembly brakes and the operating means for said aerodynamic brakes being adapted to be operated in a predetermined sequence.

7. In a brake arrangement, the combination of a car body, trucks supporting said car body, said trucks having spaced wheel and axle assemblies, brakes adapted to have braking cooperation with said wheel and axle assemblies, operating means for said wheel and axle assembly brakes, aerodynamic brakes on the roof of said car body and pivotally mounted on and forming a substantially unbroken contour with the car roof, means for normally maintaining said aerodynamic brakes in inoperative position, an operating cylinder disposed beneath said car body and operatively connected to said aerodynamic brakes, the operating means for the wheel and axle assembly brakes and the operating means for said aerodynamic brakes being adapted to be operated selectively in a predetermined sequence.

8. In a brake arrangement, the combination of a car body, trucks supporting said car body, said trucks having spaced wheel and axle assemblies, brakes adapted to have braking cooperation with said wheel and axle assemblies, aerodynamic brakes on the roof of said car body and pivotally mounted on and forming a substantially unbroken contour with the car roof, operating means for operating the brakes for the wheel and axle assemblies and for operating said aerodynamic brakes, said operating means including a live lever operatively connected to said aerodynamic brakes, a cylinder the piston of which is connected to said live lever, a live lever connected to the brakes of one of the car trucks and to said first named live lever, and a dead lever connected to the brakes of the other of said trucks and to said second named live lever.

9. In a brake arrangement, the combination of a car body, trucks supporting said car body, said trucks having spaced wheel and axle assemblies, brakes adapted to have braking cooperation with said wheel and axle assemblies, aerodynamic brakes on the roof of said car body and pivotally mounted on and forming a substantially unbroken contour with the car roof, operating means on said car body for operating the brakes for the wheel and axle assemblies and for operating said aerodynamic brakes, said operating means including a live lever operatively connected to said aerodynamic brakes, a cylinder mounted on the car body, the piston of said cylinder being connected to said live lever, a live lever connected to the brakes of one of the car trucks and to said first named live lever, and a dead lever mounted on said car body and connected to the brakes of the other of said trucks and to said second named live lever.

10. In a brake arrangement, the combination of a car body, trucks supporting said car body, said trucks having spaced wheel and axle assemblies, brakes adapted to have braking cooperation with said wheel and axle assemblies, aerodynamic brakes on the roof of said car body and pivotally mounted on and forming a substantially unbroken contour with the car roof, operating means on said car body for operating the brakes for the wheel and axle assemblies and for operating said aerodynamic brakes, said operating means including a live lever one end of which is operatively connected to said aerodynamic brakes, a cylinder mounted on the car body, the piston of said cylinder being connected to the other end of said live lever, a live lever one end of which is connected to the first named live lever intermediate the ends thereof, the other end of said second named live lever being connected to the brakes of one of the car trucks, and a dead lever pivotally connected to the car body, the free end of said dead lever being connected to the brakes of the other of said trucks, said second named live lever and said dead lever being connected to each other intermediate the ends thereof.

11. In a brake arrangement, the combination of a car body, trucks supporting said car body, aerodynamic brakes disposed on said car body, and means for operating the same including a fluid cylinder connected to said car body and disposed beneath the underframe thereof.

12. In a brake arrangement, the combination of a car body, trucks supporting said car body, aerodynamic brakes disposed on said car body, means for operating the same including a fluid cylinder connected to said car body and disposed beneath the underframe thereof, and flexible means operatively connected to the piston of said cylinder and to said brakes.

13. In a brake arrangement, the combination of a car body, trucks supporting said car body, said trucks having spaced wheel and axle assemblies, brakes adapted to have braking cooperation with said wheel and axle assemblies, aerodynamic brakes on said car body, and common operating means disposed beneath said car body for serial operation of said brakes, said means comprising fluid cylinders for said first-named brakes and a fluid cylinder for said second-named brakes.

14. In a brake arrangement, the combination of a car body, trucks supporting said car body, said trucks having spaced wheel and axle assemblies, brakes adapted to have braking cooperation with said wheel and axle assemblies, aerodynamic brakes on said car body, and means for operating both of said brakes, said means including a fluid cylinder, and means connecting the piston of said cylinder to both of said brakes.

15. In a brake arrangement, the combination of a car body, trucks supporting said car body, said trucks having spaced wheel and axle assemblies, brakes adapted to have braking cooperation with said wheel and axle assemblies, aerodynamic brakes on said car body, and means for operating both of said brakes, said means including a fluid cylinder mounted on said car body between said trucks, and means connecting the piston of said cylinder to both of said brakes.

16. In a brake arrangement, the combination of a car body, trucks supporting said car body, said trucks having spaced wheel and axle assemblies, brakes adapted to have braking cooperation with said wheel and axle assemblies, aerodynamic brakes on said car body, and means for operating both of said brakes, said means including a fluid cylinder having a piston, interconnected levers connected to said piston, means connecting one of said levers to said aerodynamic brakes, and means connecting another of said levers to said wheel and axle assembly brakes.

17. In a brake arrangement, the combination of a car body, trucks supporting said car body, said trucks having spaced wheel and axle assemblies, brakes adapted to have braking cooperation with said wheel and axle assemblies, aerodynamic brakes on said car body, and means for operating both of said brakes, said means including a fluid cylinder mounted on said car body and having a piston, interconnected levers connected to said piston, means connecting one of said levers to said aerodynamic brakes, and means connecting another of said levers to said wheel and axle assembly brakes.

18. In a brake arrangement, the combination of a car body, trucks supporting said car body, said trucks having spaced wheel and axle assemblies, brakes adapted to have braking cooperation with said wheel and axle assemblies, aerodynamic brakes on the roof of said car body and pivotally mounted on and forming a substantially unbroken contour with the car roof, means for normally maintaining said aerodynamic brakes in inoperative position, an operating cylinder disposed beneath said car body and operatively connected to said aerodynamic brakes, the operating means for the wheel and axle assembly brakes and the operating means for said aerodynamic brakes being adapted to be operated simultaneously.

19. In a brake arrangement, the combination of a car body, trucks supporting said car body, said trucks having spaced wheel and axle assemblies, brakes adapted to have braking cooperation with said wheel and axle assemblies, operating means for said wheel and axle assembly brakes, aerodynamic brakes on the roof of said car body and pivotally mounted on and forming a substantially unbroken contour with the car roof, means for normally maintaining said aerodynamic brakes in inoperative position, an operating cylinder disposed beneath said car body and operatively connected to said areodynamic brakes, the operating means for the wheel and axle assembly brakes and the operating means for said aerodynamic brakes being adapted to be operated serially.

20. In a brake arrangement, the combination of a car body, trucks including wheel and axle assemblies supporting said car body, brakes adapted to have braking cooperation with said wheel and axle assemblies, aerodynamic brakes on said car body, and means for operating both of said brakes, said means including a fluid cylinder, and means connecting the piston of said cylinder to both of said brakes.

21. In a brake arrangement, the combination of a car body, trucks including wheel and axle assemblies supporting said car body, brakes adapted to have braking cooperation with said wheel and axle assemblies, aerodynamic brakes on said car body, and means for operating both of said brakes, said means including a fluid cylinder mounted on said car body between said trucks, and means connecting the piston of said cylinder to both of said brakes.

22. In a brake arrangement, the combination of a car body, trucks including wheel and axle assemblies supporting said car body, brakes adapted to have braking cooperation with said wheel and axle assemblies, aerodynamic brakes on said car body, and means for operating both of said brakes, said means including a fluid cylinder having a piston, interconnected levers connected to said piston, means connecting one of said levers to said aerodynamic brakes, and means connecting another of said levers to said wheel and axle assembly brakes.

23. In a brake arrangement, the combination of a car body, trucks including wheel and axle assemblies supporting said car body, brakes adapted to have braking cooperation with said wheel and axle assemblies, areodynamic brakes on said car body, and means for operating both of said brakes, said means including a fluid cylinder mounted on said car body and having a piston, interconnected levers connected to said piston, means connecting one of said levers to said aerodynamic brakes, and means connecting another of said levers to said wheel and axle assembly brakes.

24. In a brake arrangement, the combination of a car body, trucks including wheel and axle assemblies supporting said car body, brakes adapted to have braking cooperation with said wheel and axle assemblies, aerodynamic brakes including a vane streamlined in inoperative position into the roof of said car and forming a substantially unbroken contour therewith, means for mounting said vane for movement relative to said car body, and means for operating both of said brakes, said means including a fluid cylinder, and means connecting the piston of said cylinder to both of said brakes.

25. In a brake arrangement, the combination of a car body, trucks including wheel and axle assemblies supporting said car body, brakes adapted to have braking cooperation with said wheel and axle assemblies, aerodynamic brakes including a plurality of vanes streamlined in inoperative position into the roof of said car and forming a substantially unbroken contour therewith, means for mounting said vanes for movement relative to said car body, and means for operating both of said brakes, said means including a fluid cylinder, and means connecting the piston of said cylinder to both of said brakes.

26. In a brake arrangement, the combination of a car body, trucks including wheel and axle assemblies supporting said car body, brakes adapted to have braking cooperation with said wheel and axle assemblies, aerodynamic brakes including a plurality of vanes streamlined in inoperative position into the roof of said car and forming a substantially unbroken contour therewith, means for mounting said vanes for movement relative to said car body, and means for operating both of said brakes, said means including a fluid cylinder mounted on said car body between said trucks, and means connecting the piston of said cylinder to both of said brakes.

27. In a brake arrangement, the combination of a car body, trucks including wheel and axle assemblies supporting said car body, brakes adapted to have braking cooperation with said wheel and axle assemblies, aerodynamic brakes including a plurality of vanes streamlined in inoperative position into the roof of said car and forming a substantially unbroken contour therewith, means for mounting said vanes for movement relative to said car body, and means for operating both of said brakes, said means including a fluid cylinder having a piston, interconnected levers connected to said piston, means connecting one of said levers to said aerodynamic brakes, and means connecting aonther of said levers to said wheel and axle assembly brakes.

28. In a brake arrangement, the combination of a car body, trucks including wheel and axle assemblies supporting said car body, brakes adapted to have braking cooperation with said wheel and axle assemblies, aerodynamic brakes including a plurality of vanes streamlined in inoperative position into the roof of said car and forming a substantially unbroken contour therewith, means for mounting said vanes for movement relative to said car body, and means for operating both of said brakes, said means including a fluid cylinder mounted on said car body and having a piston, interconnected levers connected to said piston, means connecting one of said levers to said aerodynamic brakes, and means connecting another of said levers to said wheel and axle assembly brakes.

29. In a brake arrangement, the combination of a car body, trucks including wheel and axle assemblies supporting said car body, brakes adapted to have braking cooperation with said wheel and axle assemblies, aerodynamic brakes on said car body, and operating means disposed beneath said car body for operation of both of said brakes, said means being adapted to be operated for synchronizing the application of both of said brakes.

30. In a brake arrangement, the combination of a car body, trucks including wheel and axle assemblies supporting said car body, brakes adapted to have braking cooperation with the wheels of said assemblies, aerodynamic brakes on said car body, and common operating means disposed beneath said car body for serial operation of said brakes, said means including fluid cylinders and means connecting the pistons of said cylinders to said brakes.

31. In a brake arrangement, the combination of a car body, trucks including wheel and axle assemblies supporting said car body, brakes adapted to have braking cooperation with the wheels of said assemblies, aerodynamic brakes operatively associated with the car roof and forming a substantially unbroken contour therewith when in inoperative position, and common operating means disposed beneath said car body for serial operation of said brakes, said means including fluid cylinders and means connecting the pistons of said cylinders to said brakes.

32. In a brake arrangement, the combination of a car body, trucks including wheel and axle assemblies supporting said car body, brakes adapted to have braking cooperation with said wheel and axle assemblies, aerodynamic brakes operatively associated with the car roof and forming a substantially unbroken contour therewith when in inoperative position, and means for operating both of said brakes, said means including a fluid cylinder, and means connecting the piston of said cylinder to both of said brakes.

33. In a brake arrangement, the combination of a car body, trucks including wheel and axle assemblies supporting said car body, brakes adapted to have braking cooperation with the wheels of said assemblies, aerodynamic brakes operatively associated with the car roof and forming a substantially unbroken contour therewith when in inoperative position, and means disposed beneath said car body for operating both of said brakes, the operating means for the wheel and axle assembly brakes and the operating means for said aerodynamic brakes being adapted to be operated serially.

34. In a brake arrangement, the combination of a car body, trucks including wheel and axle assemblies supporting said car body, brakes adapted to have braking cooperation with said wheel and axle assemblies, aerodynamic brakes operatively associated with the car roof and forming a substantially unbroken contour therewith when in inoperative position, and means for operating both of said brakes, said means including a fluid cylinder, and means connecting the piston of said cylinder to both of said brakes.

R. W. CLYNE.
ARMAND H. PEYCKE.
WALTER H. BASELT.